United States Patent

[11] 3,577,767

| [72] | Inventor | Udino Stedile<br>Pinnerolo, Italy |
|---|---|---|
| [21] | Appl. No. | 879,289 |
| [22] | Filed | Nov. 24, 1969 |
| [45] | Patented | May 4, 1971 |
| [73] | Assignee | Beloit Corporation<br>Beloit, Wis. |

[54] FELT PERMEABILITY TESTING APPARATUS
2 Claims, 9 Drawing Figs.
[52] U.S. Cl. .................................................. 73/38
[51] Int. Cl. .......................................... G01n 15/08
[50] Field of Search .......................................... 73/38

[56] References Cited
UNITED STATES PATENTS
2,618,151  11/1952  Leas .............................. 73/38
2,880,609  4/1959  Byrkett et al. ................. 73/38
3,111,836  11/1963  Emmons III ............... 73/38
3,433,056  3/1969  Bruni et al. ................... 73/38

*Primary Examiner*—Louis R. Prince
*Assistant Examiner*—William A. Henry, II
*Attorneys*—Dirk J. Veneman, John S. Munday and Gerald A. Mathews ABSTRACT: Various permeability characteristics of a sample of felt or other permeable web materials are determined by testing apparatus comprising a pair of interchangeable platens between which the sample is subjected to controlled compression as a measured flow of liquid is forced through the sample from one platen to the other along a predetermined flow path established by the particular pair of platens installed in the apparatus.

UDINO STEDILE
INVENTOR.

BY Herald A. Mathews
Agent

UDINO STEDILE
INVENTOR.

UDINO STEDILE

INVENTOR.

BY

UDINO STEDILE
INVENTOR.

BY Herald A. Mathews
Agent 3,577,767

FELT PERMEABILITY TESTING APPARATUS

BACKGROUND OF THE INVENTION

1. Field of the Invention

The present invention relates to apparatus for testing permeability characteristics of felt or the like and the effect of compression on those characteristics.

2. Description of the Prior Art

In many applications in which felt or a similar material is employed to absorb or filter liquids, it is important to be able to evaluate quantitatively the permeability characteristics of various samples of such materials. In the past, these determinations have been made by the obvious expedient of determining how much liquid can be absorbed in a felt sample of a particular size or how much liquid will pass through a certain area of such a sample in a given time under the influence of a predetermined hydraulic pressure head. Such tests, however, do not indicate meaningfully the absorptive or permeability qualities which the felt will exhibit when it is subjected to various degrees of compression, as in the case of the press felt employed to remove moisture from paper being formed in a papermaking machine. Additionally, in evaluating felt samples for use in the latter type of application, it is also of interest to determine the effects of felt compression not only on the permeability of a felt web with respect to the transverse flow of liquid directly through the felt from one face to the other, but also with respect to the lateral flow which may occur within the felt web in generally parallel relation to its opposed faces.

SUMMARY OF THE INVENTION

The present invention provides a simple but versatile and accurate felt permeability testing apparatus comprising a pair of interchangeable parallel platens between which the sample is subjected to testing compression. A measured flow of liquid is forced through a known area of the sample from one platen to the other along a predetermined flow path established by the particular pair of platens installed in the apparatus.

Various means for practicing the invention and other advantages and novel features thereof will be apparent from the following detailed description of an illustrative preferred embodiment of the invention, reference being made to the accompanying drawings in which like reference numerals denote like elements.

In the accompanying drawings:

FIG. 1 is a partially cross sectioned elevational view of a felt permeability testing apparatus according to a preferred embodiment of the present invention;

FIG. 2 corresponds to an enlarged portion of Fig. 1 and illustrates in cross section the two platens utilized in the apparatus to measure transverse permeability of a felt sample;

FIG. 3 is a partially cross sectioned plan view of one of the two substantially identical platens depicted in FIG. 2;

FIG. 4 corresponds generally to FIG. 2 but shows the provision of the apparatus with a different pair of platens used to test the filtration capacity of a felt sample;

DESCRIPTION OF THE ILLUSTRATIVE PREFERRED EMBODIMENT

Figure 1:
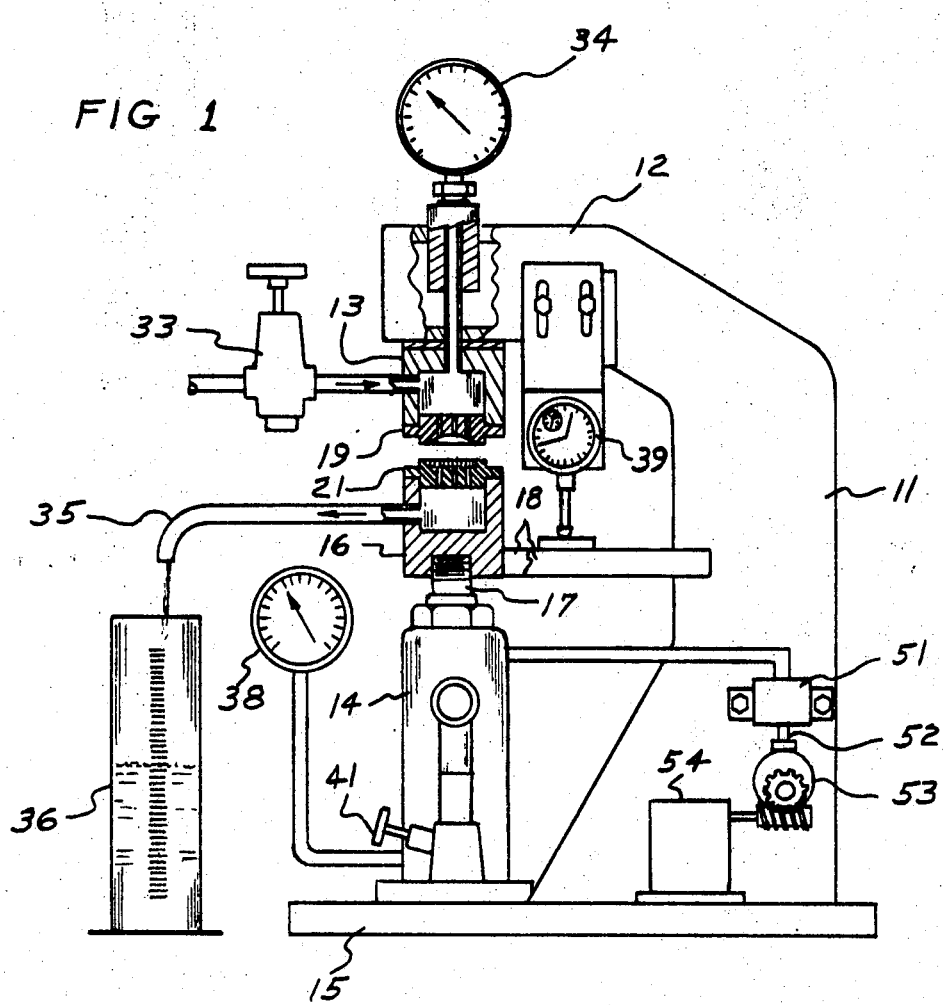

As depicted in FIG. 1 of the accompanying drawings, the illustrative preferred embodiment of the invention comprises a heavy rigid frame member 11 including a cantilevered upper arm 12 which supports a depending upper platen support member 13. A conventional hydraulic jack 14 is mounted to the base plate 15 of the frame member and is provided with a lower platen support member 16 carried by the upper end of its vertical piston rod 17 in coaxial alignment with the upper platen support member. The upper platen support member is prevented from rotating about its vertical axis by being rigidly secured to the frame member. The lower platen support member is similarly prevented from rotating by a pair of arms 18 extending therefrom and straddling the vertical portion of frame member 11. Accordingly, the two platen members remain in nonrotatable relation to one another as the lower one is forcefully raised by jack 14.

Figure 2:
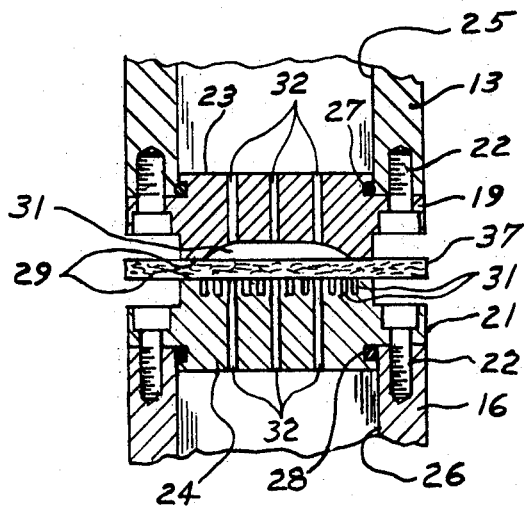
Figure 3:
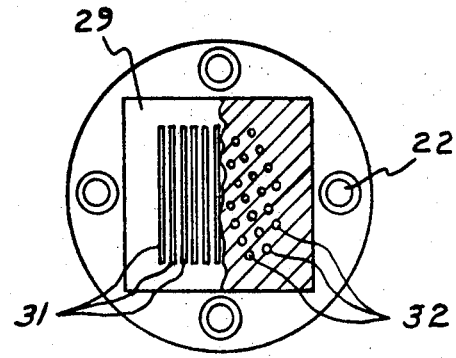

Platens 19 and 21, shown in FIG. 1, are depicted in greater detail in FIGS. 2 and 3 and are mounted to the respective upper and lower platen support members by bolts 22. Cylindrical bosses 23 and 24 on the respective platens are received in the corresponding cylindrical bores 25 and 26 of platen support members 13 and 16 to maintain the platens in coaxial alignment with one another. O-rings 27 and 28 surround the respective cylindrical bosses of the platen members and are seated against chamfered surfaces at the confronting ends of the support member bores to provide fluid tight joints.

The two platens 19 and 21 are substantially identical and include confronting square pressure faces 29, each of which is provided with a plurality of narrow parallel slots 31. The two platen members are oriented so that their respective slots 31 are in right angle or parallel relation to one another, with each slot being in communication with the bore of the corresponding platen support member through three of the holes identified generally by numeral 32 in FIGS. 2 and 5.

Referring back to FIG. 1, it will be seen that pressurized water can be introduced into the bore of the upper platen support member through a pressure regulating valve 33 to provide a predetermined hydraulic head indicated by pressure gauge 34. The internal bore 26 of the lower platen support member is provided with an outlet tube 35 which discharges into a graduated beaker 36. Consequently, when a felt sample 37 is located between the confronting faces of the two platens and compressed under the influence of jack 14, water can be forced through the felt sample under a known pressure and the rate of flow can be measured by determining the amount of water discharged into beaker 36 in a given period of time. Also, jack 14 is provided with a pressure gauge 38 which is calibrated to indicate the compressive force exerted on a predetermined unit area of the felt sample, e.g., in pounds per square inch or in kilograms per square centimeter. A dial indicator 39 is adjustably supported by frame member 11 and is calibrated to indicate the spacing between the confronting faces of the platens installed in the apparatus, thereby allowing direct reading of the thickness of the felt sample under various compressive loads.

To determine the transverse permeability characteristics of a felt specimen under different degrees of compression, the specimen is inserted between the opposed faces of platens 19 and 21 supported by the respective platen support members 13 and 16. The hydraulic jack 14 is then operated manually until pressure gauge 38 indicates a predetermined compressive load on the felt sample. As shown in the graph depicted in FIG. 9 of the accompanying drawings, this initial compression pressure is represented as being approximately 25 kilograms per square centimeter. The water supply system is turned on and pressure regulator 33 is adjusted until pressure gauge 34 indicates the predetermined constant inlet pressure, for example 1 kilogram per square centimeter. When this has been accomplished, the rate of flow of liquid into the graduated beaker 36 is measured over an interval of one minute and the rate of flow in liters per minute is plotted against the compression pressure of 25 kilograms per square centimeter on the chart. Rather than using a graduated beaker to determine the flow rate, it is of course possible to incorporate an appropriately calibrated flow meter directly in the outlet line from the lower platen support member, thereby allowing such readings to be made directly.

Figure 9:
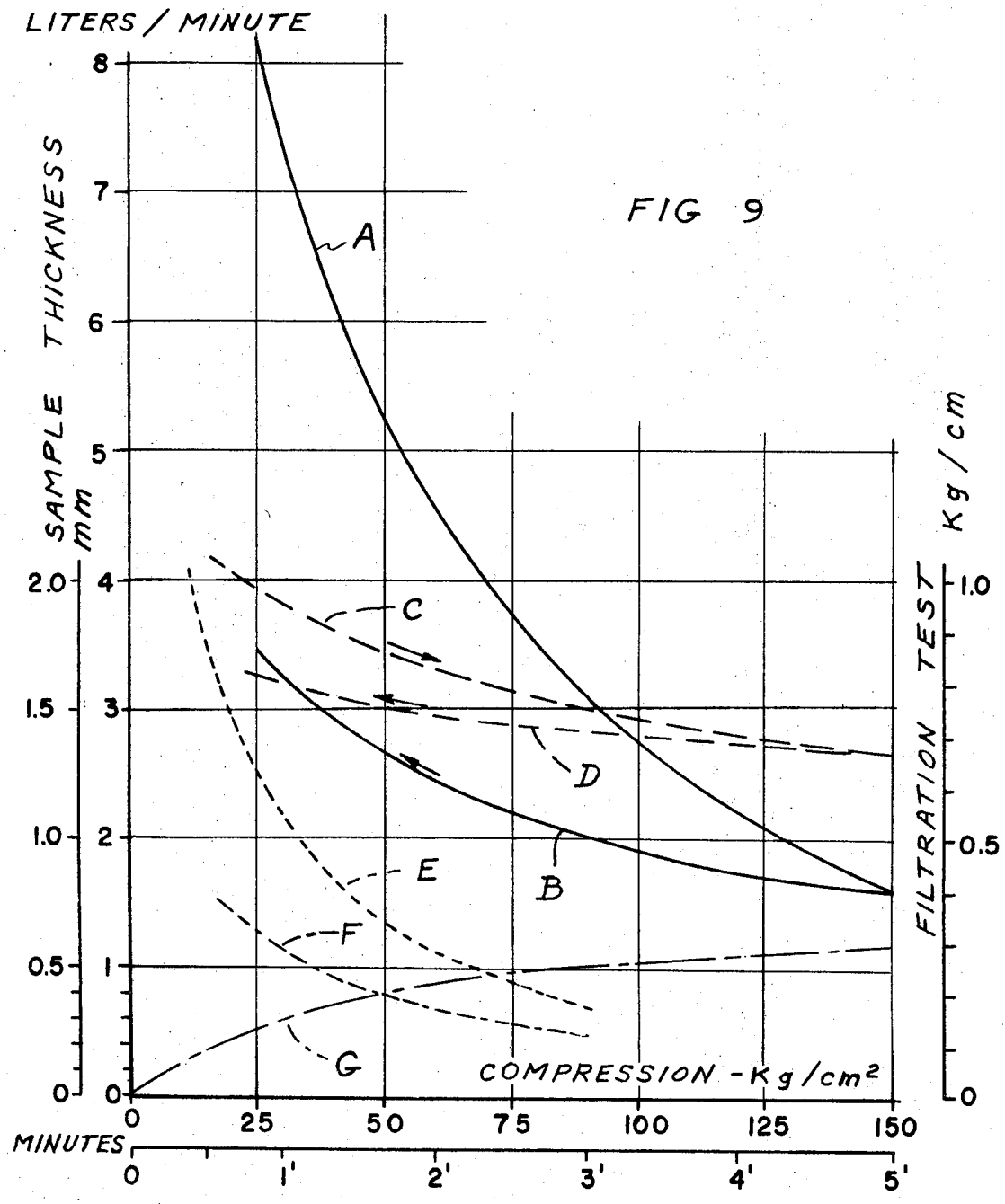
FIG. 9 is a chart showing the results of different tests conducted on a particular felt sample by means of the subject apparatus.

After the first point of the curve has been established, the jack is operated to increase the compression of the specimen so that a second point can be plotted on the graph representing the flow rate at that predetermined increase in pressure. By repeating this process, it therefore will be seen that the curve identified by letter A in FIG. 9 represents the gradual decrease in transverse permeability of the felt specimen as the compression of that specimen is gradually increased. Since the slots 31 in the two platens 19 and 21 are at right angles to one another and of equal area, the flow of liquid through the specimen is in substantially transverse relation to the two faces thereof and uniform cross the area defined by the platen slots, thereby minimizing the migration of water through the specimen in a direction parallel to its faces.

After the specimen has been subjected to the maximum desired degree of compression, the compressive pressure can gradually be released by means of relief valve 41 on jack 14 while the corresponding flow rates are plotted in the same manner just described; thereby providing a curve as shown at B in FIG. 9, which is indicative of the irreversible deformation experienced by the felt sample.

During the foregoing procedure, dial indicator 39 can also be employed to record the correlation between the different compressive pressures exerted on the felt and its thickness, as illustrated by plotted lines C and D on the graph shown in FIG. 9.

Figures 7, 8:
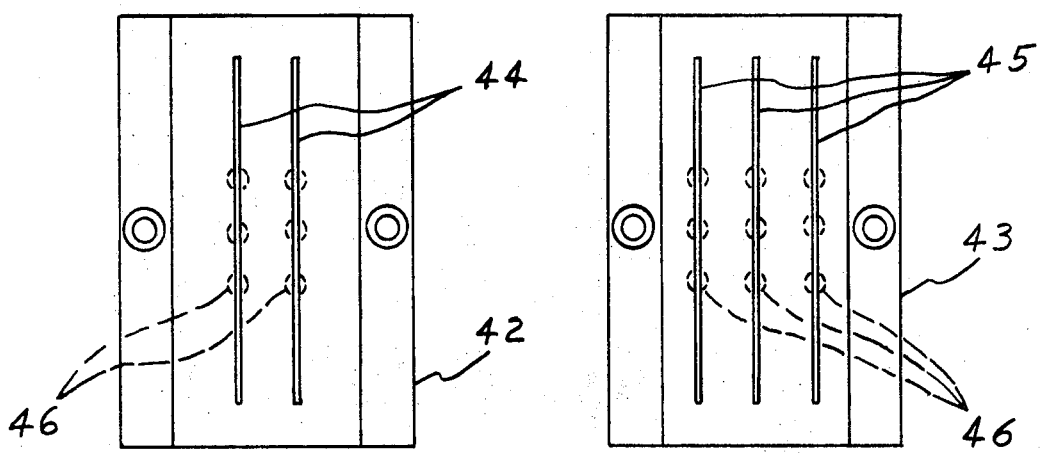
FIGS. 7 and 8 are respective plan views of the upper and lower platens depicted in FIG. 6.
Figure 6:
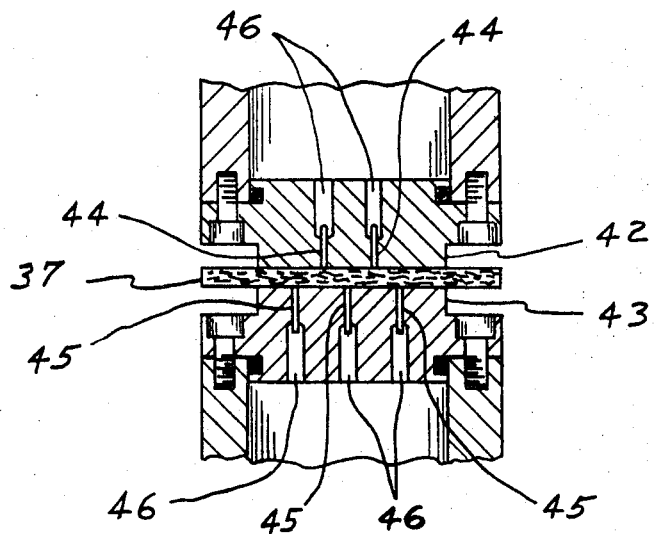
FIG. 6 is similar to FIGS. 2 and 4 but depicts the illustrated apparatus provided with a pair of platens used to measure the transverse permeability of a felt sample.

To determine the permeability of the specimen to longitudinal migration of water therein, i.e. to the movement of water in parallel relation to the specimen faces, platens 42 and 43, shown respectively in FIGS. 7 and 8, are mounted to corresponding platen support members 13 and 16 as depicted in FIG. 6. By reference to those three FIGS. it will be seen that the upper platen 42 is provided with two elongate slots 44, which are straddled by three corresponding slots 45 in the lower platen 43. The slots in these platens, which likewise communicate with the bores of the respective platen support members through holes 46, are somewhat wider and considerably longer than those in the previously described platens 19 and 21, thereby providing substantially the same effective flow capacity. When the felt specimen 37 is compressed between these longitudinal permeability testing platens, however, it will be seen that water forced into the specimen through the two slots 44 in the upper platen member must migrate longitudinally relative to the specimen in order to emerge through the three slots 45 in the lower platen member. Therefore, by plotting the flow rate against various compressive loads in the same manner previously described, the longitudinal permeability of the specimen can be graphically represented as shown by curve E in FIG. 9.

The curve derived by mathematically dividing curve E by curve C is shown at F in FIG. 9 to indicate graphically the longitudinal permeability of the specimen in terms of its thickness under different compressive loads. Obviously, other curve combinations can also be plotted in the same way.

Figure 4:
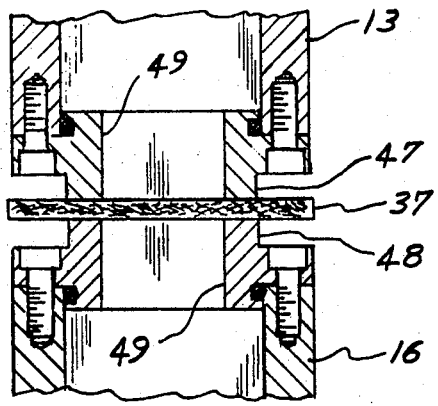
Figure 5:
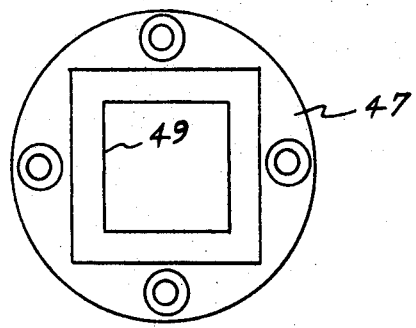
FIG. 5 is a plan view of one of the two substantially identical platens shown in FIG. 4.

Platen members 47 and 48, shown in FIGS. 4 and 5, are substantially identical and are provided with rectangular central openings 49 of a predetermined area. This pair of platens is employed to determine the filtering characteristics of the felt sample, i.e. the reduction in permeability which the sample experiences due to swelling of the felt material upon absorption of moisture and plugging of the felt by particles carried in the liquid solution. To make this determination, the felt sample is compressed between the two platen members under sufficient force to compact it about the margins of central rectangular openings so that liquid is prevented from migrating longitudinally through that area of the specimen; whereupon the hydraulic pressure required to maintain a predetermined flow of water or an aqueous suspension of particles through the sample is plotted as a function of elapsed time. A representative curve derived from this test is depicted at G in FIG. 9, to show the gradual reduction in permeability experienced by the sample material. Similar curves, of course, could be plotted with different aqueous suspensions, as desired.

In addition to measuring the effects of static compression on the permeability of a felt specimen, the subject apparatus can also be employed to produce a pulsating compressive effect simulating that experienced by a press felt in passing repetitively through a roll nip in a papermaking machine. This type of test is performed by utilizing an auxiliary valve less pulsation pump 51 shown in FIG. 1, which is connected to jack 14. Plunger 52 of this auxiliary pump is reciprocated by cam 53 as the latter is rotated by electric motor 54, whereby an oscillating pressure is imposed on the platens supplementing the compressive force established manually by the operation of the jack. Obviously, the results of various tests employing such an oscillating pressure can be plotted in substantially the same manner previously described.

The invention has been described with reference to a specific illustrative embodiment thereof, but it will be apparent that variations and modifications can be effected within the spirit and scope of the invention as hereinbefore disclosed and as defined in the appended claims.

I claim:

1. An apparatus for measuring permeability characteristics of a specimen of permeable web material, said apparatus comprising:
   a. a frame,
   b. pressure exerting means carried by said frame,
   c. a stationary platen support member mounted to said frame,
   d. a movable platen support member supported in opposed alignment with said stationary platen support member by said pressure exerting means for forcible movement toward said stationary platen support member,
   e. first and second removable perforate platen members respectively supported by said stationary and movable platen support members in aligned confronting relation to one another for compressing a permeable web specimen located between said platen members under a compressive force exerted by said pressure exerting means,
   f. flow establishing means for providing a flow of liquid through a predetermined area of the portion of said sample compressed between said platen members, and
   g. pressure measuring means for measuring the pressure exerted on said sample between said platen members by said pressure exerting means,
   h. thickness measuring means for measuring the thickness of said sample during compression thereof between said first and second platen members.

2. An apparatus for measuring permeability characteristics of a specimen of permeable web material, said apparatus comprising:
   a. a frame,
   b. pressure exerting means carried by said frame, said means being adapted to exert a pulsating compressive force on the sample compressed between said platen members,
   c. a stationary platen support member mounted to said frame,
   d. a movable platen support member supported in opposed alignment with said stationary platen support member by said pressure exerting means for forcible movement toward said stationary platen support member,
   e. first and second removable perforate platen members respectively supported by said stationary and movable platen support members in aligned confronting relation to one another for compressing a permeable web specimen located between said platen members under a compressive force exerted by said pressure exerting means,
   f. flow establishing means for providing a flow of liquid through a predetermined area of the portion of said sample compressed between said platen members, and
   g. pressure measuring means for measuring the pressure exerted on said sample between said platen members by said pressure exerting means.